March 31, 1931.  G. WALKER  1,798,236
SCALE
Filed Nov. 14, 1927
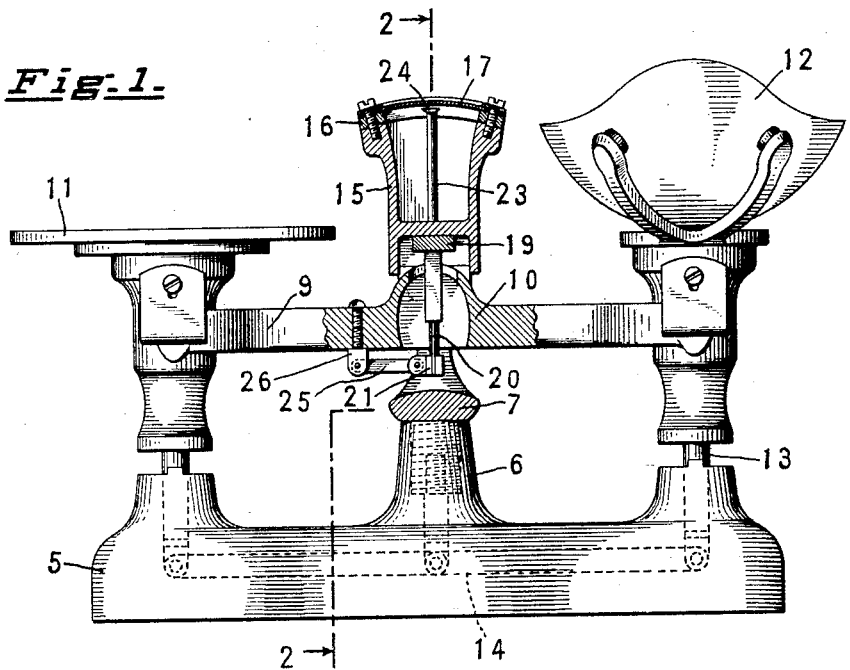
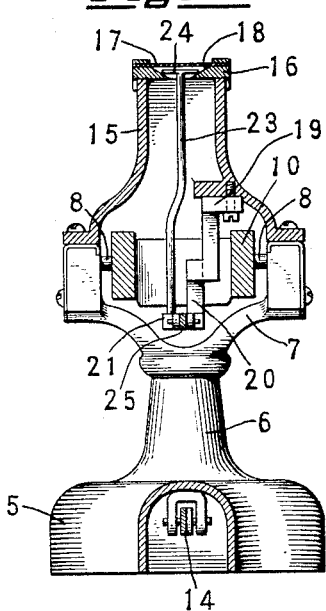
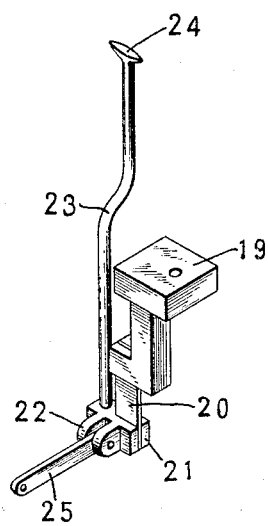
INVENTOR.
George Walker
BY
ATTORNEYS.

Patented Mar. 31, 1931

1,798,236

UNITED STATES PATENT OFFICE

GEORGE WALKER, OF BROOKLYN, NEW YORK, ASSIGNOR TO THE JACOBS BROTHERS CO., INC., OF BROOKLYN, NEW YORK, A CORPORATION OF NEW YORK

SCALE

Application filed November 14, 1927. Serial No. 233,052.

This invention relates to a scale of improved construction and aims to provide a device of this character which may be used in numerous different associations, but is particularly adapted to be employed in connection with the weighing of commodities.

It is an object of the invention to provide a device of this type which will accurately register in an improved manner, any over or under-weight.

It is a further object to provide a scale which does not necessarily have to be mounted in a truly horizontal plane in order to weigh with precision.

Another object is that of constructing a scale which may be built to occupy a relatively small amount of space.

An additional object is that of furnishing a scale, the parts of which will be relatively few in number and individually rugged and simple in construction, to be readily assembled in order to furnish an inexpensive device operating over long periods of time with freedom from difficulty.

With these and further objects in mind reference is had to the attached sheet of drawings illustrating one practical embodiment of the invention and in which:

Figure 1 is a partly sectional side elevation of one form of scale embodying the improved construction of the present invention.

Figure 2 is a transverse section taken along the lines 2—2 in the direction of the arrows of Fig. 1, and Figure 3 is a perspective view showing a detail of the construction employed.

In these views the numeral 5 indicates a base having a pedestal 6 supporting yoke arms 7 providing fulcrums (not shown) for pivots 8 of a beam 9, it being here observed that, if desired, the beam may centrally take the form of a collar 10. Supported upon opposite ends of the beam in any desired manner are, for example, a platform 11 and a scoop 12, the supports therefor having stems 13 connected by a bar 14 within the base of the scale.

The foregoing construction may be varied in numerous aspects according to the needs of the installation, it being furthermore appreciated that a dash-pot (not shown) may be associated with the scale. In any event, however, it is preferred that the yoke 7 may support, rigidly, a housing 15 having an arcuate upper edge portion mounting a cover plate 16 which, in turn, supports a transparent strip 17 and this plate conveniently having upon its surface 18 a series of graduations.

Fixedly secured to the interior of the housing is a bracket 19 which extends downwardly and supports, at its lower end the upper end of a spring strip 20, the lower end of which mounts a block 21 having, in the embodiment illustrated, a pair of spaced ears 22 and an extended portion from which a pointer 23 projects upwardly to have its head 24 overlie the surface 18. A link 25 has one of its ends pivotally connected between the ears 22 and its opposite end is connected, as at 26, to the beam 9.

Thus, it will be obvious that the strip 20 serves normally to maintain the beam in a neutral position, it being obvious, in this connection, that the ends of the strip 20 may be connected to the block 21 and the bracket 19 in such manner that the parts may readily be set after the device has been assembled. Also it is apparent that the bracket 19 might have some suitable provision for rendering it shiftable to permit the parts to be properly adjusted.

If the beam is deflected to either side of the horizontal or neutral position, it will be apparent that such deflection will immediately be registered by the pointer 23 and that the amount of the deflection will be apparent upon observing the head 24 of this pointer in conjunction with the graduations appearing upon the surface 18. The deflection of the pointer, by this construction, will not be equal to the amount of deflection of the beam but instead, will be far in excess of the same, as will be readily apparent, so that the slightest error will be immediately apparent. This renders a scale of this type particularly valuable, not alone in the dispensing of commodities, but also where an extremely fine measurement is to be resorted to, it being observed that the pointer is not alone rocked, but that its base is, in effect, shifted to each side of a theoretical pivot and according to the direction of deflection of the beam.

Thus, among others, the several objects specifically aforementioned are achieved. It is intended, however, that numerous changes in construction and rearrangement of the parts might be resorted to without departing from the spirit of the invention as defined by the claims.

Having described my invention what I claim as new and desire to secure by Letters Patent is:

1. A scale including a rockingly mounted beam, a registering mechanism comprising a relatively movable dial and pointer, means connecting one of said elements to said beam to register in an exaggerated manner deflections of the latter from neutral position means whereby said registering mechanism may be viewed solely from a point substantially above said scale and a support for one of the elements of said registering mechanism and including a spring.

2. A scale of the even-balance type and including a rockingly mounted beam, a non-horizontally extending spring flexion strip, means for retaining the upper end of the latter against movement and means connecting the lower end of the same to said beam.

3. A scale including a rockingly mounted beam, a non-horizontally extending spring flexion strip, means for retaining the upper end of the latter against movement, means connecting the lower end of the same to said beam and a registering mechanism also connected to the lower end of the strip.

4. A scale including a rockingly mounted beam, a non-horizontally extending spring flexion strip, means for retaining the upper end of the latter against movement, means connecting the lower end of the same to said beam, a pointer also connected to the lower end of the strip and a dial adjacent the upper end of the pointer.

5. A scale including a rockingly mounted beam, a registering mechanism including parts arcuately movable with respect to each other and to be viewed from a point above said scale and when so viewed appearing to move in a straight path and means connecting said registering mechanism to said beam to cause the former to be deflected to an extent disproportionate to the movements of the beam.

6. A scale including a rockingly mounted beam, a bracket portion, a flexion strip extending substantially vertically and downwardly from said bracket portion, means connecting said flexion strip to said beam and registering mechanism, one of the parts of which is connected to said flexion strip, another part of said registering mechanism being connected to said bracket portion.

7. A scale including a rockingly mounted beam, a vertically extending flexion strip, means for normally retaining the upper end of such flexion strip against movement, a link connecting the lower end of said flexion strip to said beam and a registering mechanism connected with said strip to be shifted proportionate to the deflections thereof.

8. A scale including, in combination, a rockingly mounted beam, a housing extending adjacent the same, a dial portion horizontally associated with said housing and a pointer connected with said beam to register the deflections thereof, said pointer extending within said housing and above said dial portion.

9. A scale including, in combination, a rockingly mounted beam, a housing extending adjacent the same, an arcuate, upwardly facing dial portion supported by said housing and a pointer connected with said beam and extending within said housing to a point adjacent said dial portion.

10. A scale including a downwardly extending flexion strip, a rockingly mounted beam, means for fixedly supporting the upper end of said strip, means movably connecting the lower end of the same with said beam and a registering mechanism part also connected to the lower end of the strip.

In testimony whereof, I affix my signature.

GEORGE WALKER.